United States Patent Office 2,732,404
Patented Jan. 24, 1956

2,732,404

PROCESS FOR THE MANUFACTURE OF DIMETHYLGLYOXIME AND DIACETYL

Jonas Kamlet, Easton, Conn., assignor to National Distillers Products Corporation, New York, N. Y., a corporation of Virginia No Drawing. Application May 25, 1953,
Serial No. 357,365

6 Claims. (Cl. 260—566)

This invention relates to the production of dimethylglyoxime and diacetyl and in particular provides a process by which diacetylmonoxime is converted into diacetyl and dimethylglyoxime by a unique reaction which will be referred to hereinafter as transoximation.

A particular object of this invention is to provide a process for the production of dimethylglyoxime which is simple and inexpensive and employs manipulative techniques which are readily adaptable to quality production at costs conducive to commercial operation and which will result in a dimethylglyoxime product of adequate purity and supply and of sufficiently low cost to provide ready availability of dimethylglyoxime for industrial purposes where it has not heretofore been available.

Another object of my invention is to provide an economic and ample supply of diacetyl to permit its use as an industrial intermediate, and in other applications for which a demand already exists.

Yet another object of this invention is to provide novel dyestuffs and pigments of unusual stability and vivid color suitable for use in paints, varnishes, enamels, pulp and paper, ink, textiles, linoleum, printing pastes, plastic and rubber compositions, cosmetics, and wherever else stable dyestuffs and pigments are required.

Dimethylglyoxime heretofore has been produced in accordance with one of several reactions. A particularly important reaction has involved the conversion of diacetylmonoxime to dimethylglyoxime by reaction of the former with hydroxylamine, or with compounds yielding hydroxylamine upon hydrolysis, as is illustrated in the following equation:

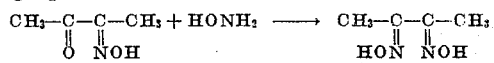

Hydroxylamine is, however, a relatively expensive industrial reagent and as such is a principal factor contributing to the prior high cost and inadequate supply of dimethylglyoxime. An important object of my invention, therefore, is to provide a process for the production of dimethylglyoxime which omits the requirement of an expensive reagent such as hydroxylamine.

I have found that when diacetylmonoxime is heated a transoximation reaction occurs in which two molecules of diacetylmonoxime dismutate to exchange an oxime radical of one for the oxygen of the ketone group of the other, resulting in a molecule of diacetyl and a molecule of dimethylglyoxime in accordance with the following equation:

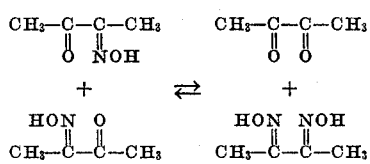

Such a discovery, however, is of itself without useful significance since the reaction is a true equilibrium. I have found the reaction may, nevertheless, be driven to substantial completion at temperatures above 88° C. (which is the boiling point of diacetyl) by withdrawing vaporous products, as they are formed, from the zone of the reaction, thus leaving dimethylglyoxime as bottoms after vaporous products (diacetyl) no longer are formed.

The process of my invention thus essentially contemplates heating diacetylmonoxime in a reaction zone to a temperature above 88° C., removing the distilled vapors from the reaction zone as they are formed, and recovering dimethylglyoxime from the residue remaining after no further diacetyl distils overhead. I also contemplate that diacetyl, which essentially is the product distilled from the mixture, be recovered as it also is a highly useful product. Although the temperature in the reaction zone can be any practicable temperature above 88° C., I have found temperatures in the range of 100°–125° C. to be particularly useful, and consequently such temperatures constitute the preferred reaction temperatures for carrying out the invention.

I have found further that, although the reaction in the absence of catalyst proceeds slowly, its rate is greatly accelerated by the presence of a small amount of an acidic catalyst. Acidic catalysts which are particularly useful in accelerating the rate of the transoximation reaction are the inorganic mineral acids, such as sulphuric, hydrochloric and phosphoric acids, the organic carboxylic and sulphonic acids, such as formic, benzene sulphonic, paratoluene sulphonic, and naphthalene sulphonic acids, inorganic and organic acid reacting salts, such as sodium bisulphate, sodium diacetate, and primary potassium phosphate, and acidic ion-exchange resins, such as "Zeo-Karb-H," a commercially available acid resistant, sulphonated coal-type material capable of exchanging hydrogen ions for metal ions. Usually from 0.01 to 10% by weight of the acid catalyst is preferred.

EXAMPLE I 202 grams of diacetylmonoxime to which 1 cc. of concentrated sulphuric acid has been added are heated in a flask fitted with a distilling head at an internal temperature of 100–125° C. Vapors are removed as they are formed until no further vapors are distilled. This requires between six and eight hours. The contents of the flask are then cooled and diluted with 500 cc. of water. Aqua ammonia is added in sufficient quantity to render the diluted contents of the flask neutral to litmus and the contents are then steam distilled to remove unreacted diacetylmonoxime which may be recovered from the steam distillate as a precipitate by saturating the distillate with ordinary salt and permitting it to stand. The steam distilled residue remaining in the flask produces on cooling a copious precipitate of dimethylglyoxime which is then recovered by filtration, washed and dried. The yields obtained are as follows.

Overhead

Diacetyl (B. P. 88° C.)—62 grams representing 36% of diacetylmonoxime charged.

Bottoms

Steam distillate:
 Diacetylmonoxime ( M. P. 74° C.)—40 grams representing 20% of the diacetylmonoxime charged.
Residues:
 Dimethylglyoxime (M. P. 237–239° C.)—83.5 grams representing 36% of the diacetylmonoxime charged.

Since 20% of the diacetylmonoxime charged was recovered and can be used again, the recovery of dimethylglyoxime actually represents about 90% conversion of diacetylmonoxime to dimethyglyoxime.

I have found a particularly useful method for recovering the dimethylglyoxime value from the reaction mixture lies in working up the reaction mixture with soluble salts of heavy metals to form the heavy metal chelates of dimethylglyoxime. These chelates are particularly useful as dyestuffs and pigments, having unusual stability up to temperatures as high as 300–350° C. and having remarkably vivid coloring which remains uniform and true over prolonged periods of time. As pigments they are useful even for coloring ceramics prior to the glazing operation because of their stability. In particular, nickel, ferrous iron, cobalt, bismuth, and lead form insoluble chelate compounds exhibiting exceptional stability and having particularly vivid coloring. Because of the high insolubility of their dimethylglyoxime chelates in water the addition of soluble salts of such metals to the reaction mixture represents a particularly useful method for recovering the dimethylglyoxime from the residue of the transoximation reaction.

EXAMPLE II

The aqueous reaction mixture resulting from dilution of the bottoms of the flask in Example I after distillation of diacetyl is analyzed for actual dimethylglyoxime content. This is conveniently done by removing a measured sample, precipitating the nickel chelate by addition of an excess of nickel salt, followed by filtering, drying, and weighing of the precipitate. To the reaction mixture is then added one-half mole of nickel acetate, based on molar content of dimethylglyoxime, and the reaction mixture is then made alkaline with aqua ammonia. A copious scarlet precipitate of the dimethylglyoxime chelate of nickel forms in quantitative yield and is recovered by filtration, washing, and drying. In place of nickel acetate other soluble nickel salts may be used, for example nickel chloride or nickel sulphate is particularly useful. The nickel dimethylglyoxime chelate is vivid scarlet in color, more closely approaching the widely used and highly prized para toluidine reds than any other mineral containing red pigments known to me.

As noted above insoluble chelate compounds may be formed by adding soluble salts of other heavy metals. Thus, the ferrous dimethylglyoxime chelate also exhibits a red color, while the cobalt chelate exhibits a yellowish-brown color. The bismuth chelate and the lead chelate both exhibit yellow colors.

I claim:

1. A process for the production of dimethylglyoxime and diacetyl which comprises heating diacetylmonoxime to a temperature above 88° C. until no further diacetyl vapors are formed, removing vaporous products from the reaction zone as they are formed, and recovering dimethylglyoxime from the remaining residue.

2. A process for the production of dimethylglyoxime and diacetyl according to claim 1 in which the diacetylmonoxime is heated in the presence of a small amount of an acidic catalyst.

3. A process for the production of dimethylglyoxime and diacetyl according to claim 1 in which the diacetylmonoxime is heated to a temperature within the range of 100–125° C.

4. A process for the production of dimethylglyoxime and diacetyl according to claim 1 in which the dimethylglyoxime is recovered from the remaining residue by diluting the residue with water, adding a soluble heavy metal salt to the diluted residue in sufficient quantity to precipitate the dimethylglyoxime chelate of the heavy metal, and recovering the dimethylglyoxime from the reaction mixture as the chelate of the heavy metal.

5. A process for the manufacture of dimethylglyoxime and diacetyl which comprises heating diacetylmonoxime at a temperature between 88° C. and 125° C. in the presence of a minor amount of an acidic catalyst, distilling off the diacetyl formed and recovering dimethylglyoxime from the remaining residue.

6. A process for the manufacture of dimethylglyoxime and diacetyl which comprises heating diacetylmonoxime at a temperature between 88° C. and 125° C. in the presence of a minor amount of an acidic catalyst, distilling off the diacetyl formed and recovering dimethylglyoxime from the remaining residue by precipitation as the nickel chelate salt.

References Cited in the file of this patent

Johlin: J. Am. Chem. Soc. 36, 1218–1221 (1914).